United States Patent [19]
Taillie et al.

[11] Patent Number: 5,616,989
[45] Date of Patent: Apr. 1, 1997

[54] FLUORESCENT LAMP SYSTEM INCLUDING AN INTEGRATED HEATER/POWER HARNESS

[75] Inventors: Joseph P. Taillie, Pittsford; Richard A. Beck; Robert W. Raus, Sr., both of Fairport; Douglas E. Proctor, Rochester; Jack K. Fullerton, Webster, all of N.Y.

[73] Assignee: Xerox Corporation, Stamford, Conn.

[21] Appl. No.: 580,215

[22] Filed: Dec. 28, 1995

[51] Int. Cl.[6] .................................................. H01J 61/52
[52] U.S. Cl. ............................. 315/32; 315/49; 315/50; 313/15; 399/220
[58] Field of Search .......................... 315/56, 32, 49, 315/50, 58, 71; 313/11, 15, 44; 355/228, 229, 69, 67

[56] References Cited

U.S. PATENT DOCUMENTS 5,095,336   3/1992   Corona et al. ........................... 355/229

FOREIGN PATENT DOCUMENTS

202653   10/1985   Japan .

Primary Examiner—Robert Pascal
Assistant Examiner—David Vu
Attorney, Agent, or Firm—Michael J. Nickerson

[57] ABSTRACT

A fluorescent light source includes a fluorescent lamp, lamp bases attached to opposite ends of the fluorescent lamp, and an electrically insulating substrate connected to the fluorescent lamp. A heating element is positioned on the fluorescent lamp, and a first and second pair of power traces are formed on the electrically insulating substrate. The first pair of power traces are connected to the heating element to provide power thereto. The second pair of power traces are connected to a pair of electrical conductors that provide power to the fluorescent lamp. This fluorescent lamp can be used in a replaceable fluorescent light source unit for a document scanner. The replaceable fluorescent light source unit includes a housing, lamp base receiving members attached to the housing, and registration notches to properly align the fluorescent lamp.

17 Claims, 6 Drawing Sheets

FLUORESCENT LAMP SYSTEM INCLUDING AN INTEGRATED HEATER/POWER HARNESS

FIELD OF THE PRESENT INVENTION

The present invention is directed to a fluorescent lamp for a document scanner that includes an integrated heater/power harness. More specifically, the present invention is directed to a fluorescent lamp which includes a heating element and an attached electrically insulating substrate which has formed thereon the power traces that provide electrical power to both the heating element surrounding the fluorescent lamp and the fluorescent lamp.

BACKGROUND ON THE PRESENT INVENTION

Figure 1:
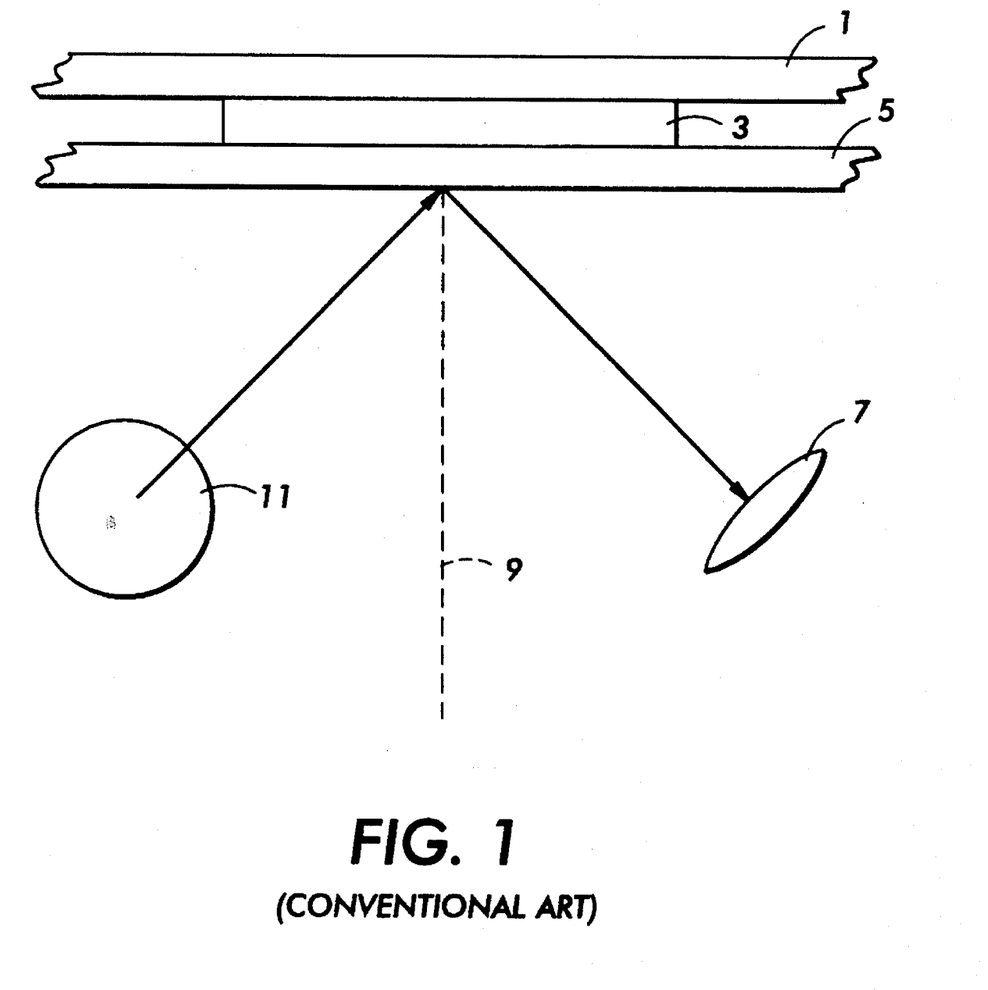
FIG. 1 illustrates a conventional illumination system for a document scanner.

FIG. 1 illustrates a conventional document scanner. In the conventional scanner, a light source 11 is used to illuminate a document 3 having an image thereon. The conventional document scanner also includes a glass platen 5 upon which the document 3 rests and a platen cover 1. FIG. 1 also shows the optical center line 9 for the conventional document scanner.

To scan the image on the document, the light source 11 illuminates the document 3 through the glass platen 5 such that the light reflected from the document 3 passes through on optical lens system 7. The optical lens system 7 directs the reflected light to either a photosensitive recording medium, a CCD sensor, or a full width array sensor. If the reflected light is directed to a photosensitive recording medium, a latent image of the document 3 is developed thereon and is subsequently transferred to a copy substrate. On the other hand, if the reflected light is directed to a CCD sensor or a full width array sensor, the light reflected from the document 3 is converted into electronic signals forming image data which electronically represent the document 3.

To provide a full scanning of the document 3, either the document 3 is moved relative to the light source 11 and the components which receive the reflected light, or the light source 11 and the components receiving the reflected light are moved relative to the document 3.

Figure 2:
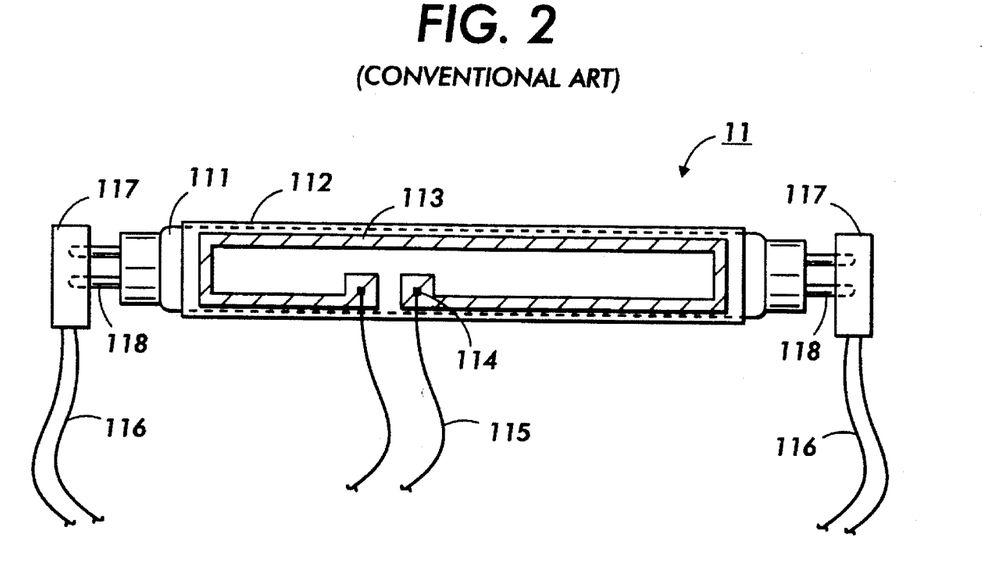
FIG. 2 illustrates a conventional light source for a document scanner.

FIG. 2 illustrates, in more detail, the light source 11 for a conventional document scanner. This conventional light source includes a fluorescent lamp 111 which produces the light coming from the light source 11. Attached to either end of the fluorescent lamp 111 are lamp bases 110 which include electrical pins 118. These electrical pins provide an electrical conduit for the fluorescent lamp so that the fluorescent lamp can receive the proper electrical power. These pins 118 also provide mechanical support by holding the fluorescent lamp 111 securely in place.

For the fluorescent lamp to be fully functional and secure, the pins 118 are placed into fluorescent lamp holders 117 which provide the mechanical support for the fluorescent lamp as well as the electrical terminals which provide the electrical power to the fluorescent lamp. The fluorescent lamp holders 117 are each connected to a pair of electrical leads 116 which are in turn connected to a power source.

The fluorescent lamp 111 is also substantially covered by a heater blanket 112 which includes a heater element 113. The heater blanket 112 may include a small slit or be transparent to allow the light produced by the fluorescent 111 to pass through the heater blanket 112 and illuminate the document 3. The heater blanket 112 is provided to prevent undesirable cold spots within the fluorescent lamp and to enable the fluorescent lamp to produce a more stabilized light.

The heating element 113 is connected to a power source through contacts 114 and electrical leads 115. Thus, to properly assemble a conventional light source in a conventional document scanner, the fluorescent lamp 111 is placed in the fluorescent lamp holders 117 and the leads 115 are soldered to the heating element at contacts 114 located on the fluorescent lamp 111.

Utilizing such a conventional light source as described above, with respect to FIGS. 1 and 2, the replacement of the light source becomes problematic. More specifically, to replace the conventional light source, the user must connect electrical leads to the heating element at the appropriate connecting pads located on the lamp which increases the time for replacement routines and can cause possible damage to the lamp.

Therefore, it is desirable that the light source for a document scanner be constructed such that the fluorescent lamp can be replaced without requiring the connection of the electric leads to the heating element through connection pads located directly on the lamp and enabling the fluorescent lamp to be easily connected or disconnected from the document scanner to facilitate a faster replacement of the lamp. It is further desirable to constructed an integrated heater/lamp power harness approach which reduces the variability of resistance of achieved through the elimination of the conventional intermediate connector.

SUMMARY OF THE PRESENT INVENTION

One aspect of the present invention is a lamp heater harness assembly. The lamp heater harness assembly includes a heating element and an electrically insulating substrate. The electrically insulating substrate has formed thereon the heating element and heating power traces. The electrically insulating substrate includes a lamp portion having the heating element formed thereon and a tail portion having the heating power traces formed thereon. The tail portion extends away from the lamp portion to provide an electrical connection to a power source.

Another aspect of the present invention is a fluorescent light source for a document scanner. This fluorescent light source includes a fluorescent lamp, an electrically insulating substrate connected to the fluorescent lamp, and a heating element positioned on the fluorescent lamp. A first and second pair of power traces are formed on the electrically insulated substrate. The first pair of power traces are connected to the heating element to provide power thereto. The second pair of power traces are connected to a pair of electrical conductors to provide power directly to the fluorescent lamp.

A third aspect of the present invention is a replaceable fluorescent light source unit for a document scanner. This replaceable fluorescent light source unit includes a housing, lamp base receiving members attached to the housing, a fluorescent lamp having lamp bases attached to opposite ends thereof and removably attached to the lamp base receiving members, an electrically insulating substrate connected to the fluorescent lamp, and a heating element positioned on the fluorescent lamp. A first and second pair of power traces are formed on the electrically insulated substrate. The first pair of power traces are connected to the heating element to provide power thereto. The second pair of power traces are connected to a pair of electrical conductors to provide power to the fluorescent lamp.

Further objects and advantages of the present invention will become apparent from the following description of the various features of the present invention.

BRIEF DESCRIPTION OF THE DRAWINGS

The following is a brief description used in describing the present invention, and thus, are being presented for illustrative purposes only and should not be limitative of the scope of the present invention, wherein.

DETAILED DESCRIPTION OF THE DRAWINGS

For a general understanding of the present invention, reference is made to the drawings. In the drawings, and in the specification, like reference numerals have been used throughout to designate identical or equivalent elements or steps.

Figure 3:
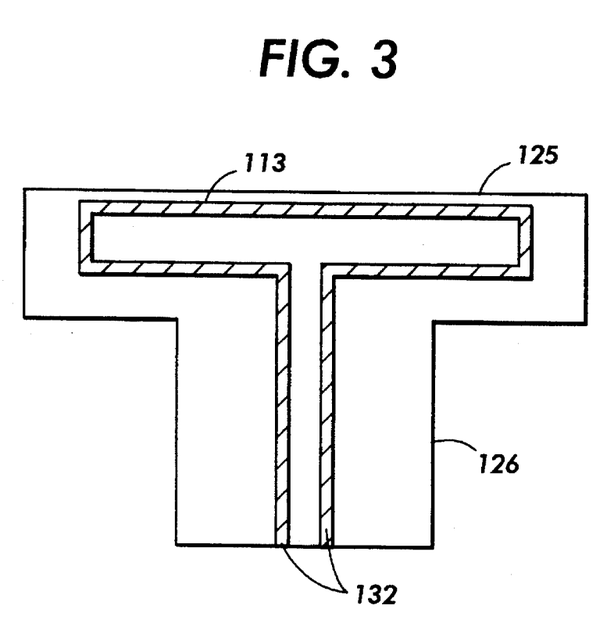
FIG. 3 illustrates a heater power harness assembly according to the concepts of the present invention.

FIG. 3, as noted above, illustrates a heater power harness for a fluorescent lamp. In this embodiment, the heater power harness includes an electrically insulating substrate 125 upon which a heating element 113 is formed. The heating element 113, in the form of a heating blanket, surrounds essentially an entire fluorescent lamp except for a small slit which enables the light produced by the fluorescent lamp 111 to pass therethrough and illuminate the document being scanned. In an alternative preferred embodiment, the heating blanket surrounds the entire fluorescent lamp and is substantially transparent so as to enable the light produced by the fluorescent lamp 111 to pass therethrough and illuminate the document being scanned.

The electrically insulating substrate 125 also has formed upon it a pair of power traces 132 which form an electrical path to supply power to the heating element 113. The electrically insulating substrate 125 has two integral portions, a lamp portion which provides electrical insulation and support for the heating element 113 and a tail portion 126 ("harness tail 126") which provides electrical insulation and support for the heating element power traces 132 and enables the heating element power traces 132 to be lead away from the heating element portion. The harness tail 126 may have a connector placed at its end (not shown) so as to enable connection to a power source. In the preferred embodiment, the end of the harness tail 126 is striped leaving bare traces. These traces are then inserted into the power source when the tail is long enough or into a scan cord when the tail is short.

The harness tail 126 may be short so that a cord is required from the power source to the connector on the end of the harness tail 126, or the harness tail 126 may be long enough to provide a direct power path from the power source to the lamp. The length of the harness tail may be adjusted to meet the specifications of the document scanner which is housing the fluorescent lamp. By constructing the substrate 125 in this manner, the harness reduces the variability of resistance achieved through the elimination of the conventional intermediate connector.

Figure 4:
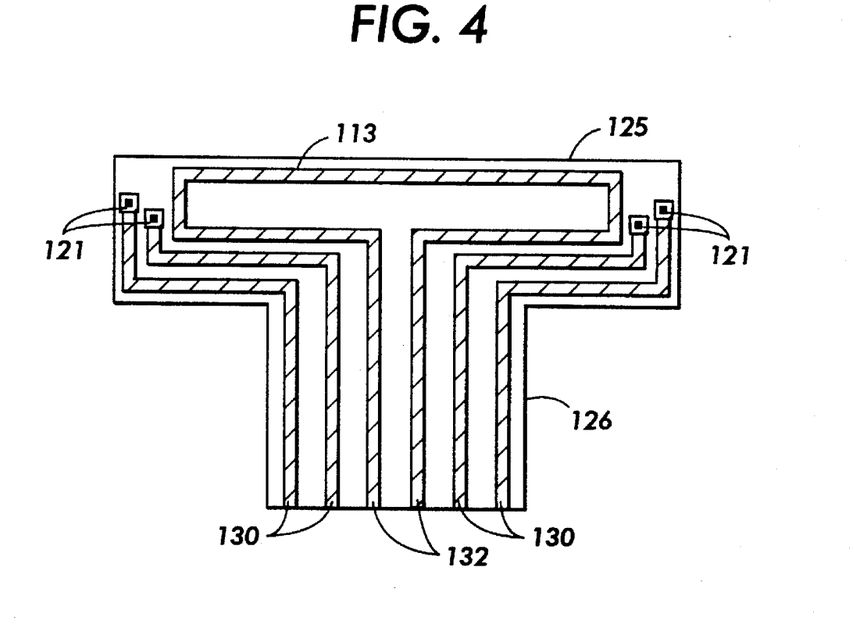
FIG. 4 illustrates one embodiment of a heater/lamp power harness according to the concepts of the present invention.

FIG. 4 illustrates a heater/lamp power harness for a fluorescent lamp. In this embodiment, the heater/lamp power harness includes an electrically insulating substrate 125 upon which a heating element 113 is formed. The electrically insulating substrate 125, as in FIG. 3, also has formed upon it a pair of power traces 132 which form a electrical path to supply power to the heating element 113. Furthermore, the electrically insulating substrate 125 has formed upon it two pairs of power traces 130 which form electrical paths to supply power to a fluorescent lamp and to the lamp filaments.

The electrically insulating substrate 125, in this embodiment, has two integral portions, a lamp portion which provides electrical insulation and support for the heating element 113, electrical connection pads 121, and portions of power traces 130 and a tail portion 126 ("harness tail 126") which provides electrical insulation and support for the heating element power traces 132 and the lamp power traces 130 and enables the heating element power traces 132 and the lamp power traces 130 to be lead away from the heating element portion. The harness tail 126 may have a connector placed at its end (not shown) so as to enable connection to a power source. In the preferred embodiment, the end of the harness tail 126 is striped leaving bare traces. These traces are then inserted into the power source when the tail is long enough or into a scan cord when the tail is short.

The harness tail 126 may be short so that a cord is required from the power source to the connector on the end of the harness tail 126, or the harness tail 126 may be long enough to provide a direct power path from the power source to the lamp. The length of the harness tail may be adjusted to meet the specifications of the document scanner which is housing the fluorescent lamp. By constructing the substrate 125 in this manner, the harness reduces the variability of resistance achieved through the elimination of the conventional intermediate connector.

Figure 5:
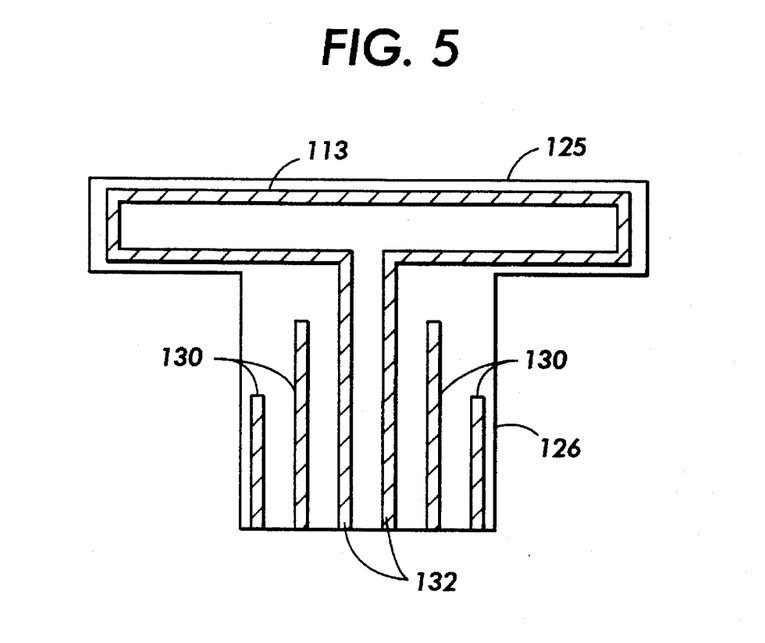
FIG. 5 illustrates a second embodiment of a heater/lamp power harness according to the concepts of the present invention.

FIG. 5 illustrates another embodiment of the heater/lamp power harness for a fluorescent lamp. In this embodiment, the heater/lamp power harness includes an electrically insulating substrate 125 upon which a heating element 113 is formed. The electrically insulating substrate 125, as in FIG. 4, also has formed upon it a pair of power traces 132 which form a electrical path to supply power to the heating element 113 and two pairs of power traces 130 which form electrical paths to supply power to a fluorescent lamp and to the lamp filaments.

The electrically insulating substrate 125, in this embodiment, has two integral portions, a lamp portion which provides electrical insulation and support for the heating element 113 and a tail portion 126 ("harness tail 126") which provides electrical insulation and support for the heating element power traces 132 and the lamp power traces 130 and enables the heating element power traces 132 and the lamp power traces 130 to be lead away from the heating element portion. The lamp power traces 130 are not formed on the lamp portion of the electrically insulating substrate 125 to allow flexibility in connecting the power to the fluorescent lamp. The harness tail 126 may have a connector placed at its end (not shown) so as to enable connection to a power source. In the preferred embodiment, the end of the harness tail 126 is striped leaving bare traces. These traces are then inserted into the power source when the tail is long enough or into a scan cord when the tail is short.

The harness tail 126 may be short so that a cord is required from the power source to the connector on the end of the harness tail 126, or the harness tail 126 may be long enough to provide a direct power path from the power source to the lamp. The length of the harness tail may be adjusted to meet the specifications of the document scanner which is housing the fluorescent lamp. By constructing the substrate 125 in this manner, the harness reduces the variability of resistance achieved through the elimination of the conventional intermediate connector.

Figure 6:
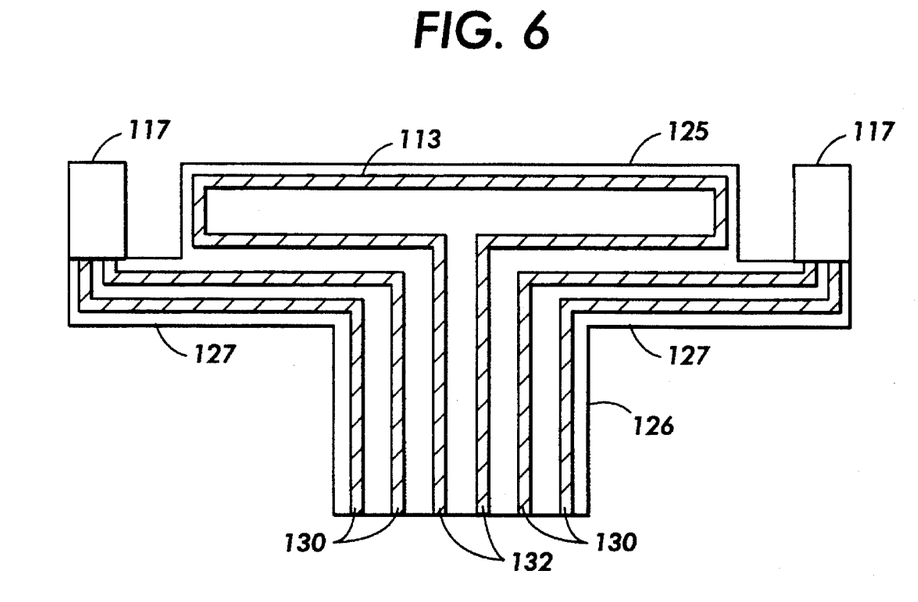
FIG. 6 illustrates a third embodiment of a heater/lamp power harness with lamp holders according to the concepts of the present invention.

FIG. 6 illustrates a third embodiment of the heater/lamp power harness for a fluorescent lamp. In this embodiment, the heater/lamp power harness includes an electrically insulating substrate 125 upon which a heating element 113 is formed. The electrically insulating substrate 125, as in FIG. 4, also has formed upon it a pair of power traces 132 which form a electrical path to supply power to the heating element 113 and two pairs of power traces 130 which form electrical paths to supply power to a fluorescent lamp and to the lamp filaments. The harness further includes lamp holders 117 to receive the fluorescent lamp.

The electrically insulating substrate 125, in this embodiment, has three integral portions, a lamp portion which provides electrical insulation and support for the heating element 113, wing portions 127 which provide a mechanical connection for the lamp holders 117 and electrical insulation and support for portions of the lamp power traces 130, and a tail portion 126 ("harness tail 126") which provides electrical insulation and support for the heating element power traces 132 and the lamp power traces 130 and enables the heating element power traces 132 and the lamp power traces 130 to be lead away from the heating element portion. There are also air gaps 119 between the lamp portion and the lamp holders 117 to provide space for the ends of the fluorescent lamp (lamp bases). The harness tail 126 may have a connector placed at its end (not shown) so as to enable connection to a power source. In the preferred embodiment, the end of the harness tail 126 is striped leaving bare traces. These traces are then inserted into the power source when the tail is long enough or into a scan cord when the tail is short.

The harness tail 126 may be short so that a cord is required from the power source to the connector on the end of the harness tail 126, or the harness tail 126 may be long enough to provide a direct power path from the power source to the lamp. The length of the harness tail may be adjusted to meet the specifications of the document scanner which is housing the fluorescent lamp. By constructing the substrate 125 in this manner, the harness reduces the variability of resistance achieved through the elimination of the conventional intermediate connector.

Figure 7:
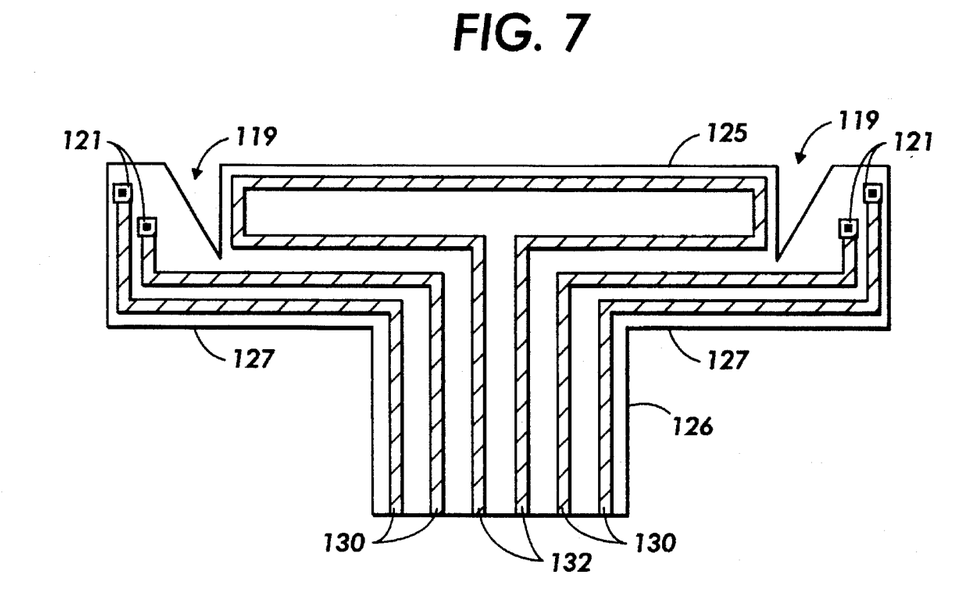
FIG. 7 illustrates a fourth embodiment of a heater/lamp power harness according to the concepts of the present invention.

FIG. 7 illustrates a fourth embodiment of the heater/lamp power harness for a fluorescent lamp. In this embodiment, the heater/lamp power harness includes an electrically insulating substrate 125 upon which a heating element 113 is formed. The electrically insulating substrate 125, as in FIG. 4, also has formed upon it a pair of power traces 132 which form an electrical path to supply power to the heating element 113 and two pairs of power traces 130 which form electrical paths to supply power to a fluorescent lamp.

The electrically insulating substrate 125, in this embodiment, has three integral portions, a lamp portion which provides electrical insulation and support for the heating element 113, wing portions 127 which provide and electrical insulation and support for electrical connection pads 121 and portions of the lamp power traces 130, and a tail portion 126 ("harness tail 126") which provides electrical insulation and support for the heating element power traces 132 and the lamp power traces 130 and enables the heating element power traces 132 and the lamp power traces 130 to be lead away from the heating element portion. There are also air gaps 119 between the lamp portion and the electrical connection pads 121 on the wing portion to provide space for the ends of the fluorescent lamp. The harness tail 126 may have a connector placed at its end (not shown) so as to enable connection to a power source. In the preferred embodiment, the end of the harness tail 126 is striped leaving bare traces. These traces are then inserted into the power source when the tail is long enough or into a scan cord when the tail is short.

The harness tail 126 may be short so that a cord is required from the power source to the connector on the end of the harness tail 126, or the harness tail 126 may be long enough to provide a direct power path from the power source to the lamp. The length of the harness tail may be adjusted to meet the specifications of the document scanner which is housing the fluorescent lamp. By constructing the substrate 125 in this manner, the harness reduces the variability of resistance achieved through the elimination of the conventional intermediate connector.

Figure 8:
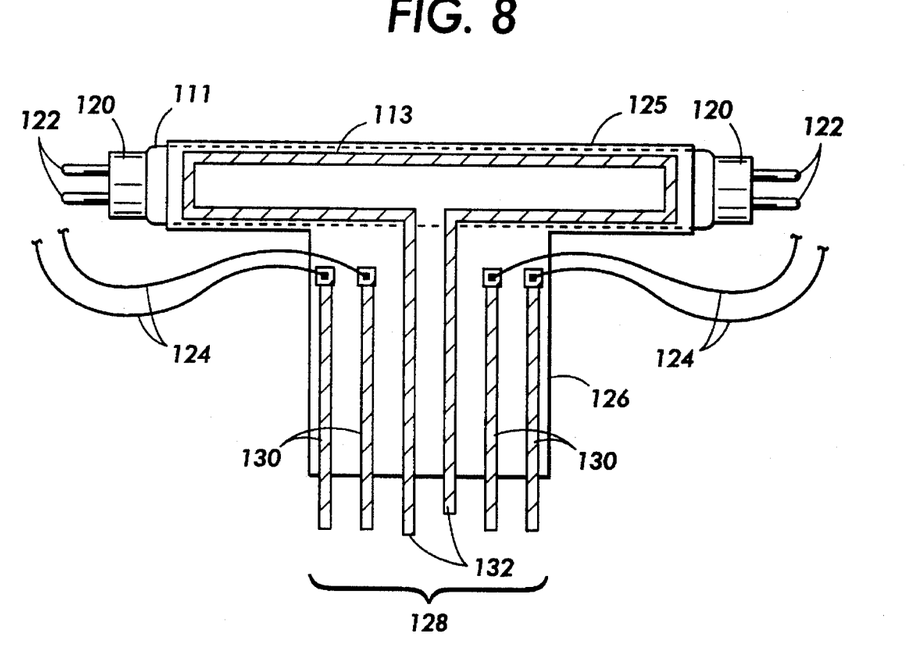
FIG. 8 illustrates a light source for a document scanner according to one embodiment of the present invention.

FIG. 8 illustrates a light source according to one embodiment of the present invention. In this embodiment, a fluorescent lamp 111 is utilized to produce light so as to illuminate the document being scanned. The fluorescent lamp 111 is surrounded by a heating blanket (not shown) which includes a heating element 113. The heating blanket surrounds essentially the entire fluorescent lamp 111 except for a small slit which enables the light produced by the fluorescent lamp 111 to pass therethrough and illuminate the document being scanned. In an alternative preferred embodiment, the heating blanket surrounds the entire fluorescent lamp 111 and is substantially transparent so as to enable the light produced by the fluorescent lamp 111 to pass therethrough and illuminate the document being scanned.

The heating element 113 provides a stable temperature gradient along the fluorescent lamp so that the light produced by the fluorescent lamp is stable. At either end of the fluorescent lamp 111, lamp bases 120 are attached. These lamp bases 120 include pins 122. The lamp bases 120 including pins 122 provide mechanical support and electrical connectivity for the fluorescent lamp 111. More specifically, the lamp bases 120 including pins 122 are received by fluorescent lamp holders (not shown) attached to the document scanner wherein the fluorescent lamp holders include receptacles for pins 122 which provide an electrical connection to the fluorescent lamp 111.

The fluorescent lamp 111 also has attached thereto an electrically insulating substrate 125 upon which a plurality of power traces 132 and 130 are formed. More specifically, a pair of power traces 132 are formed on the electrically insulating substrate 125 wherein these power traces 132 are directly connected to the heating element 113. Thus, in this embodiment, the user merely needs to connect the harness tail 126 to a connector which will provide the power to the heating element and the lamp. As noted before, the harness tail 126 may be short so that a cord is provided from the power source to the connector on the end of the harness tail 126, or the harness tail 126 may be long enough to provide a power path from the power source to the lamp. It is noted that the electrically insulating substrate 125 can be modified to resemble the substrate illustrated in FIG. 6.

The electrically insulating substrate 125 also includes two pairs of power traces 130 which are connected to electrical conductors 124 which provide the actual power to the fluorescent lamp to enable illumination. The power traces 130 are connected to the fluorescent lamp holders (not shown) of the document scanner so that the electric power can be transferred to the fluorescent lamp. It is noted that the power traces 130 and 132 formed on the electrically insulating substrate are substantially flat.

In the embodiment illustrated in FIG. 8, the fluorescent light source is an integral device which includes the fluorescent lamp 111, the heating element 113, and the electrically insulating substrate 125 which provides a platform upon which the power traces for the various components of the fluorescent lamp are formed and supported.

Figure 9:
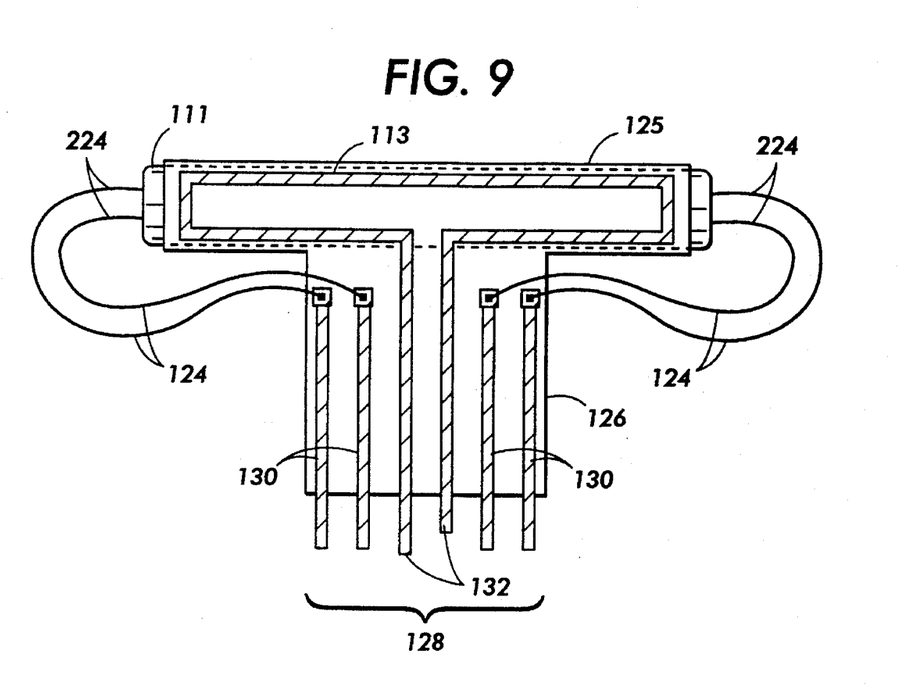
FIG. 9 illustrates a light source for a document scanner according to another embodiment of the present invention.

FIG. 9, as noted above, illustrates another embodiment of the light source according to the concepts of the present invention. In this embodiment, a fluorescent lamp 111 is utilized to produce light so as to illuminate the document being scanned. The fluorescent lamp 111 is surrounded by a heating blanket (not shown) which includes a heating element 113. The heating blanket surrounds essentially the entire fluorescent lamp except for a small slit which enables the light produced by the fluorescent lamp to pass therethrough and illuminate the document being scanned. In an alternative preferred embodiment, the heating blanket surrounds the entire fluorescent lamp 111 and is substantially transparent so as to enable the light produced by the fluorescent lamp 111 to pass therethrough and illuminate the document being scanned. The heating element 113 provides a stable temperature gradient along the fluorescent lamp so that the light produced by the fluorescent lamp is stable.

In contrast with the embodiment illustrated in FIG. 8, the light source of FIG. 9 does not include lamp bases 120 with pins 122. Instead, electrical leads 224 provide electric power to the fluorescent lamp 111 directly from the pair of electric leads 130 which are formed on the electrically insulating substrate 125 upon which a plurality of pair of power traces are formed. More specifically, a pair of power traces 132 are formed on the electrically insulating substrate 125 wherein these power traces 132 are directly connected to the heating element 113. Thus, in this embodiment, the user merely needs to connect the harness tail 126 to a connector which will provide the power to the heating element and the lamp. As noted before, the harness tail 126 may be short so that a cord is provided from the power source to the connector on the end of the harness tail 126, or the harness tail 126 may be long enough to provide a power path from the power source to the lamp. It is noted that the electrically insulating substrate 125 can be modified to resemble the substrate illustrated in FIG. 7.

In the embodiment illustrated in FIG. 9, the fluorescent light source is an integral device which includes the fluorescent lamp 111, the heating element 113, and the electrically insulating substrate 125 which provides a platform upon which the power traces for the various components of the fluorescent lamp are formed and supported.

Figure 10:
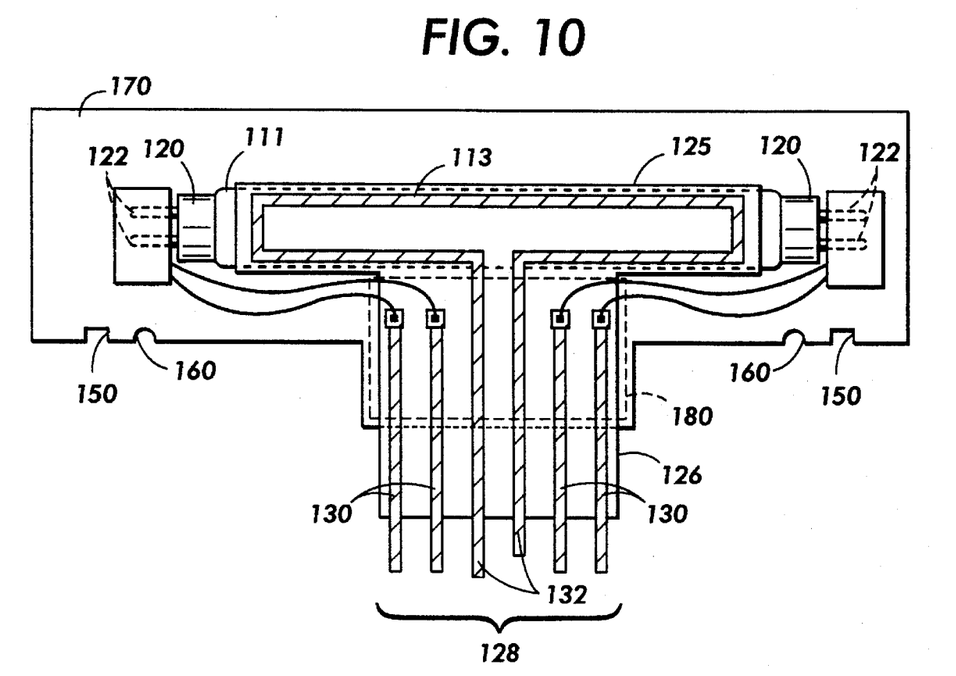
FIG. 10 illustrates a replaceable fluorescent lamp unit for a document scanner according to the concepts of the present invention.

FIG. 10, as noted above, illustrates a replaceable fluorescent lamp unit for a document scanner. This replaceable fluorescent lamp unit includes a housing 170 upon which fluorescent lamp holders 121 are integrally attached. Connected to the fluorescent lamp holders 121 are lamp bases 120 of a fluorescent lamp 111 which include pins 122. The lamp bases 120, including pins 122, provide mechanical support and electrical connectivity for the fluorescent lamp 111. More specifically, the lamp bases, including pins 122, are received by fluorescent lamp holders 121 wherein the fluorescent lamp holders include receptacles for pins 122 which provide an electrical connection to the fluorescent lamp.

The fluorescent lamp 111, as also illustrated in FIGS. 8 and 9, is substantially surrounded by a heater blanket which includes a heating element 113. The heating blanket surrounds essentially the entire fluorescent lamp except for a small slit which enables the light produced by the fluorescent lamp to pass therethrough and illuminate the document being scanned. In an alternative preferred embodiment, the heating blanket surrounds the entire fluorescent lamp 111 and is substantially transparent so as to enable the light produced by the fluorescent lamp 111 to pass therethrough and illuminate the document being scanned. The heating element 113 provides a stable temperature gradient along the fluorescent lamp so that the light produced by the fluorescent lamp is stable.

The fluorescent lamp 111 also has attached thereto an electrically insulating substrate 125 upon which a plurality of pairs of power traces are formed. More specifically, a pair of power traces 132 are formed on the electrically insulating substrate 125 wherein these power traces 132 are directly connected to the heating element 113. Thus, in this embodiment, the user merely needs to connect the harness tail 126 to a connector which will provide the power to the heating element and the lamp. As noted before, the harness tail 126 may be short so that a cord is required from the power source to the connector on the end of the harness tail 126, or the harness tail 126 may be long enough to provide a power path from the power source to the lamp.

The electrically insulating substrate 125 also includes two pairs of power traces 130 which are connected to electrical conductors 124 which are in turn connected to the fluorescent lamp holders 121 to provide the actual power to the fluorescent lamp which enables illumination.

The housing 170 further includes notches 150 which provide proper registration of the light source in the document scanner and notches 160 which enable the light source to be properly secured to the document scanner. Lastly, the replaceable fluorescent lamp unit may include a mylar pad 180 which provides further electrical insulation for the traces 130 and 132 from the housing 170 by sandwiching the traces between electrically insulating substrate 125 and the mylar pad 180. It is noted that this mylar pad may be part of the embodiments illustrated in FIGS. 5, 8, and 9.

The fluorescent light source is an integral component of the fluorescent lamp unit which includes the fluorescent lamp 111, the heating element 113, and the electrically insulating substrate 125 which provides a platform upon which the power traces for the various components of the fluorescent lamp are formed and supported.

In the embodiment illustrated in FIG. 10, when a user wishes to replace the light source in a document scanner, the user removes the entire fluorescent lamp replaceable unit and replaces it with a similar unit. This way, the user can easily replace the light source while maintaining the light source's proper position and registration within the document scanner. Moreover, the user merely needs to connect the harness tail 126 to a connector which will provide the power to the heating element and the lamp.

In all the embodiments described above, the harness tail 126 may be used for a simple electrical connection to a separate scan cord, or, it may also be used as a flexible scan cord, supplying an electrical connection to a stationary power supply during the scanning operation. Moreover, in the embodiments described above, the lamp power traces may be a pair of conductors, as illustrated, which supply power to either end of the lamp when the lamp has heating filaments, or the lamp power traces may be a single pair of conductors wherein one conductor goes to one end of the lamp and the other conductor goes to the other end of the lamp because the lamp has no heating filaments.

Although the present invention has been described in detail above, various modifications can be made without departing from the spirit of the invention. For example, the above description describes the present invention as having the heater and lamp power traces being formed on the same substrate. As an alternative, the lamp power traces can be formed on a separate substrate and then bonded to the substrate containing the heater element traces.

In summary, the present invention provides a fluorescent lamp or light source for a document scanner which can be easily connected and disconnected by the user.

While the present invention has been described with reference to various embodiments as described above, it is not confined to the details set forth above, but is intended to cover such modifications or changes as may come within the scope to the attached claims.

What is claimed is:

1. A lamp harness assembly, comprising:

a heating element; and an electrically insulating substrate;

said electrically insulating substrate having formed thereon said heating element and heating element power traces;

said electrically insulating substrate including, a lamp portion having said heating element formed thereon, and a tail portion having said heating element power traces formed thereon;

said tail portion extending away from said lamp portion to provide an electrical connection to a power source.

2. The lamp harness assembly as claimed in claim 1 wherein said electrically insulating substrate has formed thereon lamp power traces;

said lamp power traces being formed on said lamp and tail portions and further including electrical connection pads formed on said lamp portion.

3. The lamp harness assembly as claimed in claim 1 wherein said electrically insulating substrate has formed thereon lamp power traces;

said lamp power traces being formed on said tail portion.

4. The lamp harness assembly as claimed in claim 1, further comprising:

lamp holders;

said electrically insulating substrate further including wing portions;

said electrically insulating substrate has formed thereon lamp power traces;

said lamp power traces being formed on said lamp, wing, and tail portions and being electrically connected to said lamp holders.

5. The lamp harness assembly as claimed in claim 1, wherein said electrically insulating substrate further including wing portions and air gaps located between said wing portions and said lamp portion;

said electrically insulating substrate has formed thereon lamp power traces;

said lamp power traces being formed on said lamp, wing, and tail portions.

6. A fluorescent light source, comprising:

a fluorescent lamp;

an electrically insulating substrate connected to said fluorescent lamp;

a heating element positioned on said fluorescent lamp;

a first pair of power traces formed on said electrically insulating substrate and connected to said heating element to provide power thereto;

a second pair of power traces formed on said electrically insulating substrate; and a pair of electrical conductors connected to said second pair of power traces to provide power to said fluorescent lamp.

7. The fluorescent light source as claimed in claim 6, further comprising:

a third pair of power traces formed on said electrically insulating substrate; and a pair of electrical conductors connected to said third pair of power traces to provide power to said fluorescent lamp.

8. The fluorescent light source as claimed in claim 7, said fluorescent lamp has lamp bases formed at each end thereof.

9. The fluorescent light source as claimed in claim 8, further comprising:

a pair of electrical pins attached to each lamp base to provide electrical connection between said fluorescent lamp and said pairs of electrical conductors and to provide mechanical support for said fluorescent lamp.

10. The fluorescent light source as claimed in claim 7, wherein said first, second, and third pairs of power traces are substantially flat.

11. The fluorescent light source as claimed in claim 6, wherein said electrically insulating substrate is flexible.

12. A replaceable fluorescent light source unit, comprising:

a housing;

lamp base receiving members attached to said housing;

a fluorescent lamp having lamp bases attached to opposite ends thereof and removably attached to said lamp base receiving members;

an electrically insulating substrate connected to said fluorescent lamp;

a heating element positioned on said fluorescent lamp;

a first pair of power traces formed on said electrically insulating substrate and connected to said heating element to provide power thereto;

a second pair of power traces formed on said electrically insulating substrate;

a pair of electrical conductors connected to said second pair of power traces and one of said lamp base receiving member to provide power to said fluorescent lamp.

13. The replaceable fluorescent light source unit as claimed in claim 12, further comprising:

a third pair of power traces formed on said electrically insulating substrate; and a pair of electrical conductors connected to said third pair of power traces and to another of said lamp base receiving member to provide power to said fluorescent lamp.

14. The replaceable fluorescent light source unit as claimed in claim 13, further comprising:

a pair of electrical pins attached to each lamp base to provide electrical connection between said fluorescent lamp and said lamp base receiving members and to provide mechanical support for said fluorescent lamp.

15. The replaceable fluorescent light source unit as claimed in claim 14, wherein said electrically insulating substrate is flexible.

16. The replaceable fluorescent lamp unit as claimed in claim 13, wherein said first, second, and third pairs of power traces are substantially flat.

17. The replaceable fluorescent light source unit as claimed in claim 12, wherein said housing includes registration notches.

* * * * *